United States Patent
Park et al.

(10) Patent No.: US 9,808,810 B2
(45) Date of Patent: Nov. 7, 2017

(54) NOZZLE FOR DISSOLVED AIR FLOTATION SYSTEM

(71) Applicant: DOOSAN HEAVY INDUSTRIES & CONSTRUCTION CO., LTD., Gyeongsangnam-do (KR)

(72) Inventors: Sung Won Park, Gyeonggi-do (KR); Yong Hae Park, Busan (KR); Seon Jae You, Seoul (KR); Byung Sung Park, Incheon (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 310 days.

(21) Appl. No.: 14/538,226

(22) Filed: Nov. 11, 2014

(65) Prior Publication Data

US 2015/0182977 A1    Jul. 2, 2015

(30) Foreign Application Priority Data

Dec. 31, 2013    (KR) .................. 10-2013-0169248

(51) Int. Cl.
     *B01F 3/04*      (2006.01)
     *B03D 1/14*      (2006.01)
     (Continued)

(52) U.S. Cl.
     CPC ........ *B03D 1/1431* (2013.01); *B01F 3/04241* (2013.01); *B01F 3/04503* (2013.01);
     (Continued)

(58) Field of Classification Search
     CPC .............. B01F 3/04241; B01F 3/04503; B01F 5/0256; B01F 5/0268; B01F 5/0644;
     (Continued)

(56) References Cited

U.S. PATENT DOCUMENTS

| | | | | |
|---|---|---|---|---|
| 973,057 | A | * | 10/1910 | Mader ...................... F02M 1/00 |
| | | | | 138/43 |
| 2,271,982 | A | * | 2/1942 | Kreveld ................... A01J 11/16 |
| | | | | 138/44 |

(Continued)

FOREIGN PATENT DOCUMENTS

| GB | 1444027 | 7/1976 |
|---|---|---|
| JP | 1988-248428 A | 10/1988 |

(Continued)

OTHER PUBLICATIONS

Extended European Search report dated Jun. 3, 2015 in corresponding European Patent Application No. 14195674.8-1703/2889079.

*Primary Examiner* — Charles Bushey
*Assistant Examiner* — Scott Bushey
(74) *Attorney, Agent, or Firm* — Baker & McKenzie LLP

(57) ABSTRACT

A nozzle for a dissolved air flotation system includes a housing, a nozzle connector, and a nozzle body. The housing has an inlet formed at one side and an outlet formed at another side. The nozzle connector couples to the inlet and has an inflow path formed in a longitudinal direction. The nozzle body is disposed in the housing, and includes: a collision portion formed at a first end portion of the nozzle body such that a fluid introduced along the inflow path of the nozzle connector 10 changes its flow direction and collides with an inner wall of a side portion of the housing, a plurality of faces formed at sides of the nozzle body, a plurality of side paths defined between the faces and the inner wall of the housing, and a spurt hole defined at a second end portion of the nozzle body.

15 Claims, 21 Drawing Sheets

(51) Int. Cl.
*B01F 5/02* (2006.01)
*B01F 5/06* (2006.01)
*B05B 1/34* (2006.01)
*C02F 1/24* (2006.01)

(52) U.S. Cl.
CPC .......... *B01F 5/0256* (2013.01); *B01F 5/0268* (2013.01); *B01F 5/0644* (2013.01); *B05B 1/34* (2013.01); *C02F 1/24* (2013.01); *B01F 2003/04312* (2013.01); *B01F 2215/0052* (2013.01); *B03D 2203/008* (2013.01)

(58) Field of Classification Search
CPC ... B01F 2003/04312; B01F 2215/0052; B03D 1/1431; B03D 2203/008; B05B 1/34; C02F 1/24
USPC .................................... 261/76, 108
See application file for complete search history.

(56) References Cited

U.S. PATENT DOCUMENTS

| | | | | |
|---|---|---|---|---|
| 3,446,488 A | * | 5/1969 | Mail | B01F 3/04099 210/220 |
| 3,744,762 A | * | 7/1973 | Schlicht | B01F 5/0663 138/42 |
| 5,492,655 A | * | 2/1996 | Morton | B01F 5/0268 239/432 |
| 5,779,361 A | * | 7/1998 | Sugiura | B01F 5/0268 138/42 |
| 6,207,081 B1 | * | 3/2001 | Sasaki | B01F 5/0256 148/513 |
| 6,293,529 B1 | * | 9/2001 | Chang | B01F 3/04248 210/221.1 |
| 6,412,709 B1 | * | 7/2002 | Sugiura | B01F 5/0682 222/145.6 |
| 7,059,591 B2 | * | 6/2006 | Bortkevitch | B01F 3/0446 261/76 |
| 7,534,347 B2 | * | 5/2009 | Sugiura | B01D 21/01 210/221.2 |
| 7,758,024 B2 | * | 7/2010 | Takahashi | A45D 19/14 261/28 |
| 7,793,588 B2 | * | 9/2010 | Blaney | B05B 1/34 101/147 |
| 7,913,984 B2 | * | 3/2011 | Noguchi | B01F 3/0446 261/29 |
| 8,585,022 B2 | * | 11/2013 | Lee | B01F 3/04985 261/108 |
| 2007/0040051 A1 | | 2/2007 | Blaney et al. | |
| 2012/0193294 A1 | | 8/2012 | Amato et al. | |
| 2013/0215706 A1 | * | 8/2013 | Markert | B01F 5/0268 366/175.2 |

FOREIGN PATENT DOCUMENTS

| | | |
|---|---|---|
| KR | 100807189 | 2/2008 |
| KR | 100938899 | 1/2010 |

* cited by examiner

NOZZLE FOR DISSOLVED AIR FLOTATION SYSTEM

CROSS-REFERENCE TO RELATED APPLICATIONS

This application claims priority to Korean Application No. 10-2013-0169248, filed Dec. 31, 2013, the contents of which are incorporated herein in their entirety.

BACKGROUND

The present disclosure relates to a nozzle for a dissolved air flotation system, and more particularly, to a nozzle for a dissolved air flotation system which can effectively generate microbubbles even at low pressure and form the microbubbles in a more uniform size.

A Dissolved Air Flotation (DAF) method has been used as a water treatment method in water treatment equipment. A dissolved air flotation system using the DAF method has been applied to the pretreatment process of water treatment and seawater desalination equipment.

In the dissolved air flotation system, low-density suspended solids and floating matter, such as algae and organic compounds contained in inflow water are condensed by putting a coagulant, an aid coagulant, pH control chemicals and others in the inflow water. Microbubbles are generated that combine with the suspended solids and floating matter to thereby remove the suspended solids and floating matter.

The dissolved air flotation system includes a microbubble generator, a floating tank, and a scum remover. Dissolved gas flotation pressure reduction nozzles are shown in FIG. 1.

Water treatment using the dissolved air flotation system includes four steps, namely, condensation and floc formation of particles, generation of microbubbles, collision and adhesion between the microbubbles and the flocs in a mixing area, and a rise of the microbubble-floc mass in a flotation tank. Here, in order to generate microbubbles, a pump, an air injection compressor, and an air/circulating water contact tank (saturation tank) are needed. When air is dissolved and saturated in treated water and the pressure lowers rapidly, air dissolved in circulating water is discharged as microbubbles. The microbubbles adhere to the flocs, and then, agglutinates of the flocs and the microbubbles float to the surface of water in the flotation tank. In order to enhance efficiency of the dissolved air flotation system, microbubbles of a proper size must be generated, and in this instance, the nozzle is important.

Bubbles are adhered to the agglutinates, which float to the surface of the treated water. A high density of bubbles per gas volume can be generated when the bubbles reduce in size. In the water treatment process, a contact time between bubbles and flocs is increased when the flocs are distributed thinly and there are lots of microbubbles. The size of bubbles and the flotation speed of bubbles are inversely proportional. The size of bubbles generated in the dissolved air flotation system is 10 μm to 120 μm, and the average size is about 40 μm to 50 μm.

In order to generate and spray bubbles, a nozzle is used. To effectively spray the air, pressure must be reduced rapidly and a high turbulent state is needed. The speed of returned water whose pressure is reduced must be low enough not to break the flocs. In order to stir the returned water and the flocs well, an appropriate turbulence must be formed to promote contact between the bubbles and the flocs.

FIG. 1 illustrates examples of nozzles for generating microbubbles. FIG. 1(a) illustrates a WRC nozzle, FIG. 1(b) illustrates an NIWR nozzle, FIG. 1(c) illustrates a DWL nozzle, and FIG. 1(d) illustrates a RICTOR nozzle.

Each of the nozzles has the following characteristics. The NIWR nozzle and the WRC nozzle respectively have collision surfaces on a flow boundary. The DWL nozzle, the RICTOR nozzle and the NIWR nozzle change the direction of a flow path. The RICTOR nozzle and the DWL nozzle respectively have inclined surfaces at an end of the flow path.

In detail, the WRC nozzle was originally developed by Water Research Center and includes a collision plate, changes the direction of the fluid, and causes decompression through orifices with different diameters. In order to induce a momentary pressure drop in the WRC nozzle, a thin plate is perforated to form a hole, and a flow jet sprayed through the hole collides with a flat plate mounted at a slipstream side. The nozzle has a simple structure because it uses collision energy of the fluid, but has several disadvantages in that it exhibits severe performance changes depending on the pressure of the supplied fluid and in that it operates only at a relatively high pressure.

In the NIWR nozzle, a flow direction of the fluid is changed at an angle of 180 degrees because its fluid supply direction is opposed to its spray direction. A collision with the wall surface occurs where the flow direction is changed. The NIWR nozzle has several disadvantages in that it is complicated in structure and difficult to manufacture and in that it is difficult to maintain and repair when the hole is obstructed by foreign matter.

The DWL nozzle changes a fluid supply direction and a fluid spray direction at an angle of 180 degrees like the NIWR nozzle, and controls a flow rate by changing an area of a path using a stem at the middle part of the nozzle. Additionally, the DWL nozzle is designed to change a cross-sectional area according to flow paths so as to drop pressure. The nozzle is difficult to manufacture and maintain because its structure is complicated.

In the RICTOR nozzle, fluid is introduced into a conical diffusion tube through one orifice in a vertical direction. The fluid collides with the wall surface, and then, is discharged out. The RICTOR nozzle is relatively simple in structure, but is difficult to manufacture.

BRIEF SUMMARY

Accordingly, the present disclosure has been made to address the above-mentioned problems, and it is an object of the present disclosure to provide a nozzle for a dissolved air flotation system that can effectively generate microbubbles even at low pressure.

It is another object of the present disclosure to provide a nozzle for a dissolved air flotation system which can form microbubbles in a more uniform size and extend existence time of the microbubbles in a fluid.

It is a further object of the present disclosure to provide a nozzle for a dissolved air flotation system which can control the size and the existence time of the microbubbles in the fluid.

It is a still further object of the present disclosure to provide a nozzle for a dissolved air flotation system which has a simple structure and is easy to manufacture.

To accomplish the above object, according to the present disclosure, there is provided a nozzle for a dissolved air flotation system including: a housing of a tube type which has an inlet formed at one side and an outlet formed at the other side; a nozzle connector which is joined to the inlet and has an inflow path formed in a longitudinal direction; and a nozzle body inserted into the housing, the nozzle body including a collision portion formed at the front end portion such that a fluid introduced along the inflow path changes its flow direction and is collided with the inner wall of a side portion of the housing, a plurality of cut portions formed at sides thereof, a plurality of side paths formed between the cut portions and the inner wall of the housing, a spurt hole formed at the rear end portion, a collision plate formed on the spurt hole, and at least two orifices respectively formed between the cut portion and the spurt hole such that the fluid sprayed through the orifices collides with the collision plate.

The collision portion may be a bottom surface of a receiving space which is formed by the front end portion partially dented.

The bottom surface may have an inclined surface having a middle portion which is higher than an outskirt portion.

The cut portions may be a pair of cut surfaces which are parallel to both sides of the nozzle body.

The side paths may have different cross-sectional areas.

Orifices may be formed at right angles to the cut portions.

Orifices may be formed on different axes.

The collision plate may be formed at right angles to a longitudinal direction of the orifice.

In another aspect of the present disclosure, there is a nozzle for a dissolved air flotation system including: a housing having an inlet wider than an outlet; a nozzle connector of a cylindrical tube which is partially inserted into the housing; and a nozzle body inserted into the housing, the nozzle body including a plurality of cut portions formed at sides thereof so as to form a plurality of side paths between the cut portions and the inner wall of the housing, wherein the nozzle body includes: a collision portion formed at the front end portion thereof such that a fluid introduced along the inflow path collides with the collision portion so as to be diffused into the plural side paths; and a spurt hole formed at the rear end portion thereof for collecting flows of the fluids passing through the plural side paths.

The fluid which is changed in its flow direction by collision with the collision portion may second collide at right angles to the inner wall of the housing.

Orifices which connect the side paths with the spurt hole may be respectively formed at the rear end portion of the nozzle body.

The collision plate may be formed inside the spurt hole.

The orifices and the collision plate may be formed at right angles to each other.

The collision surface of the collision portion may be at an obtuse angle.

The side paths may have different cross-sectional areas.

The nozzle for the dissolved air flotation system according to an embodiment of the present disclosure may effectively generate microbubbles even at low pressure by collisions that quickly change the direction of fluid flow several times.

Moreover, the nozzle for the dissolved air flotation system may form small microbubbles in a more uniform size and extend existence time of the microbubbles in fluid. The nozzle for the dissolved air flotation system may increase contact opportunity and contact efficiency between the bubbles and flocs and increase a removal efficiency of small flocs.

Furthermore, because the nozzle may include a nozzle body that is manufactured in various sizes and can be replaced depending on flow rate, speed, impulse and direction of the fluid flowing in the nozzle, the nozzle may control the size and existence time of the microbubbles in the fluid.

Additionally, the nozzle for the dissolved air flotation system may have a simple structure, is easy to manufacture, and reduces manufacturing costs.

BRIEF DESCRIPTION OF THE DRAWINGS

The above and other objects, features and advantages of the present disclosure will be apparent from the following detailed description in conjunction with the accompanying drawings, in which:

FIG. 1 are cross-sectional views illustrating examples of nozzles for generating microbubbles, wherein

FIG. 2 are cross-sectional views illustrating various examples of nozzles for generating microbubbles which were used in tests, wherein

DETAILED DESCRIPTION

Figure 1A:
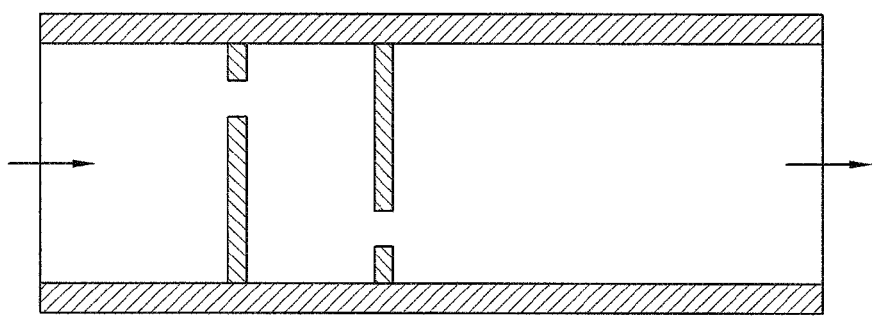
FIG. 1(a) illustrates a WRC nozzle.
Figure 1B:
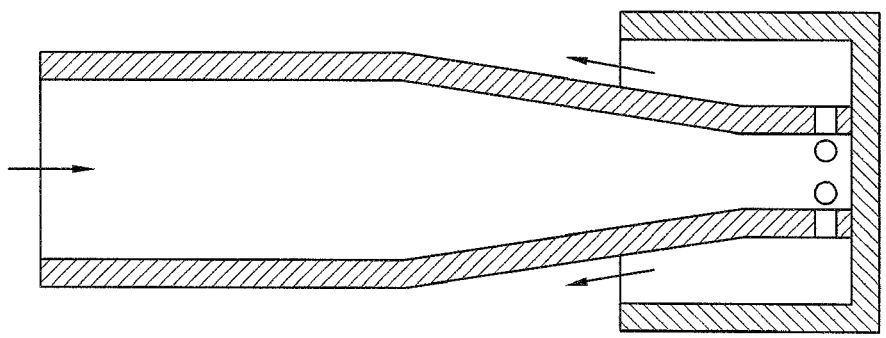
FIG. 1(b) illustrates an NIWR nozzle.
Figure 1C:
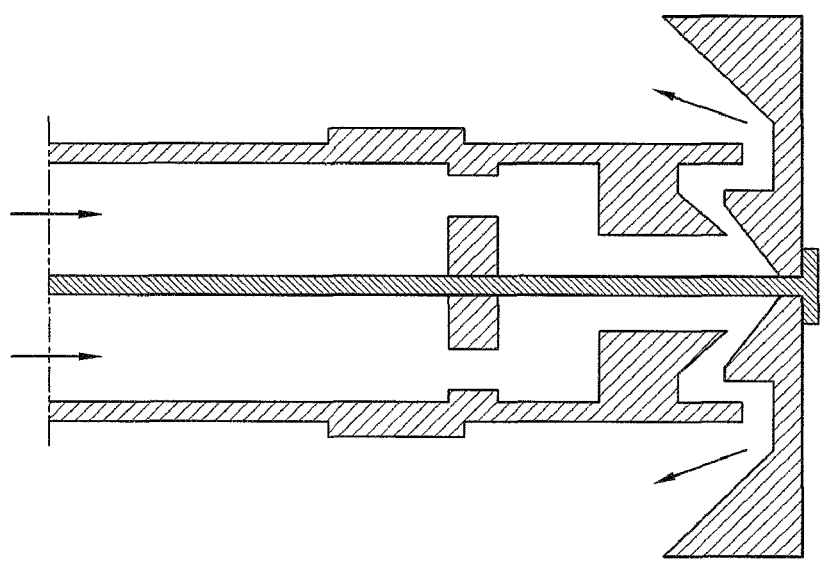
FIG. 1(c) illustrates a DWL nozzle.
Figure 1D:
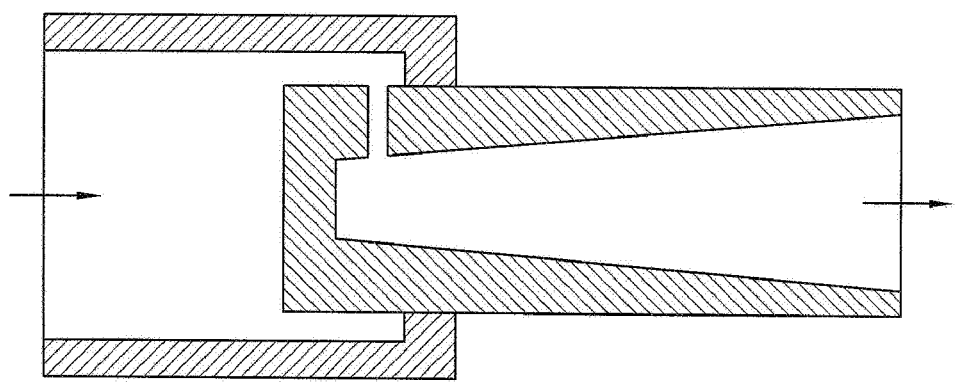
FIG. 1(d) illustrates a RICTOR nozzle.

Reference will be now made in detail to embodiments of the present disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

Referring to the drawings, the nozzle for the dissolved air flotation system will be described in detail.

Figure 3:
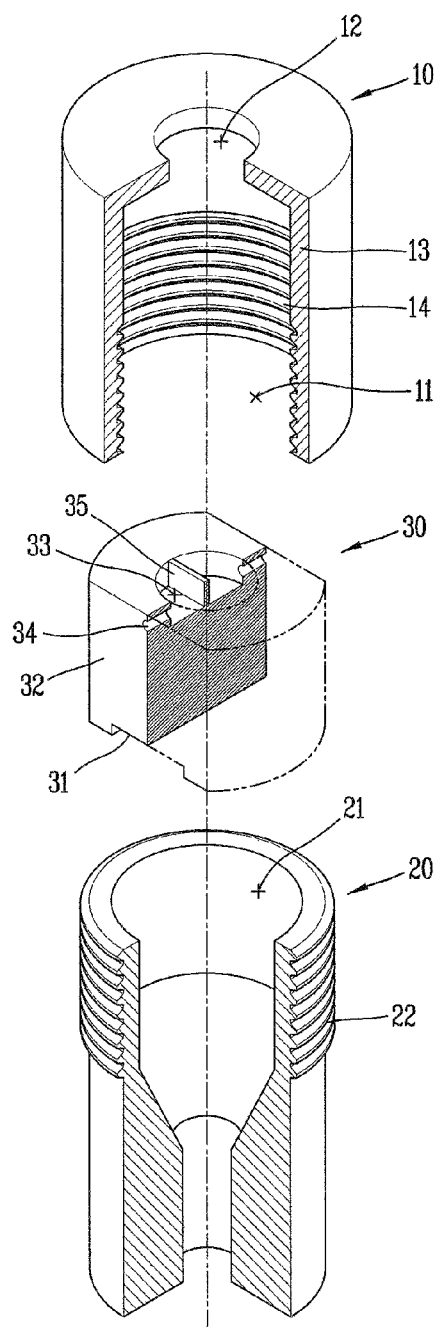
FIG. 3 is an exploded perspective view of a nozzle for a dissolved air flotation system according to an embodiment of the present disclosure.
Figure 4:
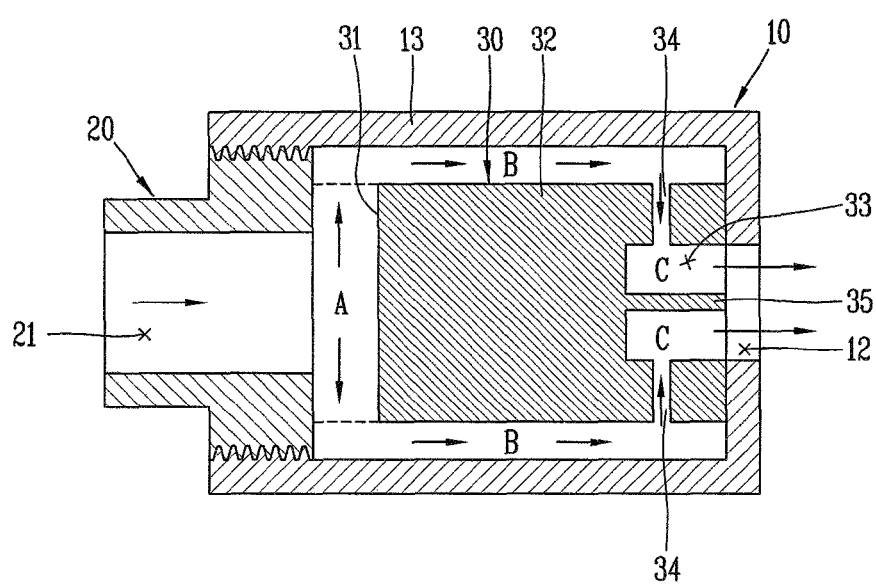
FIG. 4 is a vertical cross-sectional view of a nozzle for a dissolved air flotation system according to an embodiment of the present disclosure.
Figure 5A:
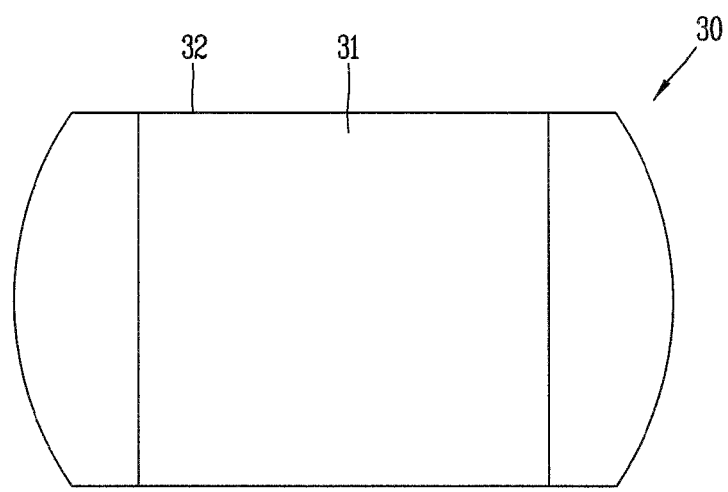
FIG. 5(a) is a plan view of a front end part of a nozzle body of FIG. 3.
Figure 5B:
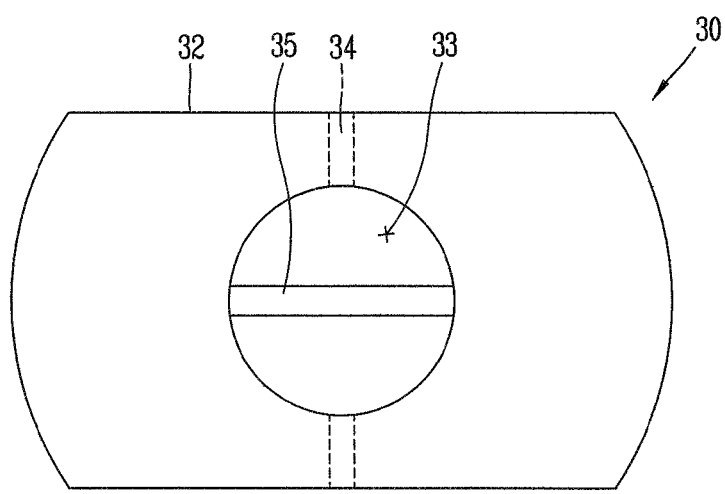
FIG. 5(b) is a plan view of a rear end part of the nozzle body of FIG. 3.

FIG. 3 is an exploded perspective view of a nozzle for a dissolved air flotation system according to an embodiment of the present disclosure, FIG. 4 is a vertical cross-sectional view of a nozzle for a dissolved air flotation system according to an embodiment of the present disclosure, and FIG. 5 is a cross-sectional view taken along the line A-A of FIG. 4.

In an embodiment, a nozzle for a dissolved air flotation system includes: a housing 10 of a tube type which has an inlet 11 formed at one side and an outlet 12 formed at the other side; a nozzle connector 20 which is joined to the inlet 11 and has an inflow path 21 formed in a longitudinal direction; and a nozzle body 30 inserted into the housing 10. The nozzle body 30 includes a collision portion 31 formed at a front end portion such that a fluid introduced along the inflow path 21 collides with the inner wall of a side portion 13 of the housing 10 and changes its flow directions. A plurality of cut portions 32 are formed at sides of the housing 10. A plurality of side paths (B) are formed between the cut portions 32 and the inner wall of the housing. A spurt hole 33 is formed at the rear end portion. A collision plate 35 is formed on the spurt hole 33, and at least two orifices 34 are respectively formed between the cut portion 32 and the spurt hole 33 such that the fluid sprayed through the orifices collides with the collision plate 35.

The housing 10 is approximately formed in a tube shape. One side of the housing 10 is open and includes the inlet 11 to which the nozzle connector 20 is joined. A joining portion 14 at the inlet 11 may be formed with a screw thread in order to be joined with the nozzle connector 20. The outlet 12 is formed at the center of the other side of the housing 10. An inner diameter of the outlet 12 is smaller than an inner diameter at the side portion 13 of the housing 10. That is, the outlet 12 is smaller than the inlet 11. Fluid is introduced through the inlet 11 of the housing 10 and is discharged out through the outlet 12.

The nozzle connector 20 is formed in a tube shape and is joined to the joining portion 14 of the housing 10. The nozzle connector 20 includes a joining portion 22 having a screw thread formed on the outer circumferential surface of one end portion thereof. When the nozzle connector 20 is joined to the housing 10, the nozzle body 30, which is inserted into the housing 10, can be fixed and supported.

The nozzle connector 20 has an inflow path 21 along a central axis in the longitudinal direction. The fluid is introduced into the housing 10 through the inflow path 21.

The nozzle body 30 is formed in an approximately piston shape. The nozzle body 30 may be made of synthetic resin.

The flat collision portion 31 is formed at a front end portion of the nozzle body 30. The collision portion 31 may be a bottom surface of a receiving space (A) formed by the front end portion which is partially dented. The fluid introduced through the inflow path 21 collides with the collision portion 31, such that the flow of the fluid may be changed at a right angle, and then collides with the inner wall of the side portion 13 of the housing 10.

The cut portions 32 are formed at both sides of the nozzle body 30. The cut portions 32 may be cut surfaces formed at both sides of the nozzle body in parallel along the longitudinal direction. Therefore, when the nozzle body 30 is inserted into the housing 10, a space is formed between the inner wall of the side portion 13 of the housing 10 and the cut portions 32 of the nozzle body 30 so as to form the side path (B) between the cut portions 32 and the inner wall of the housing 10. The fluid introduced through the inflow path 21, first, collides with the collision portion 31 so as to change the flow direction, for example, at right angles, second, collides with the inner wall of the side portion 13 of the housing 10 so as to change the flow direction, for example, at right angles again, and then, flows along the side paths (B). In an embodiment, because the side paths (B) are symmetrically formed at both sides, the fluid flows into two parts. That is, the fluid flows toward the rear end portion of the housing 10 along the flow path divided into two parts after two collisions and two sudden direction changes.

The spurt hole 33 is formed at the center of the rear end portion of the nozzle body 30 so as to form a spurt space (C). The spurt hole 33 may be a cylindrical hole.

The orifice 34 is formed between the cut portion 32 and the spurt hole 33 of the nozzle body 30. The orifice 34 is a straight hole. The orifice 34 may be vertically formed on the cut surface of the cut portion 32. The fluid introduced along the side path (B) is sprayed at high speed toward the spurt space (C) through the orifice 34.

The collision plate 35 is formed at the rear end portion of the nozzle body 30. The collision plate 35 may be formed inside the spurt hole 33. The collision plate 35 may be formed perpendicularly to the longitudinal direction of the orifice 34. The fluid flowing along the side path (B) in two parts is respectively sprayed into the spurt holes 33 through the orifices 34 at high speed, and then, collides in a third collision with both sides of the collision plate 35. The fluid is decompressed while exiting the orifice 34, and forms microbubbles when colliding with the collision plate 35. The fluid changes its flow direction a third time, for example, at right angles by colliding with the collision plate 35, and then, exits through the outlet 12.

Now, the action of the nozzle for the dissolved air flotation system according to an embodiment of the present disclosure will be described.

The fluid introduced through the inflow path 21 of the nozzle connector 20 firstly collides with the collision portion 31 of the nozzle body 30 so as to change its flow direction, such that the fluid is divided into two parts and spreads outwardly from the center. The divided fluid secondly collides with the inner wall 13 of the side portion of the housing 10 so as to change its flow direction, such that the fluid flows to the rear end portion of the nozzle body 30 along the side path (B). The two collisions and direction changes control the speed and flow rate of the fluid and forms turbulence. The turbulent fluid is sprayed into the spurt space (C), which is formed at the center of the rear end portion of the nozzle body 30, through the orifices 34 at the rear end portion of the nozzle body 30. The fluid sprayed through the orifices 34 thirdly collides with the collision plate 35 formed in the spurt space (C) so as to change its flow direction, and then, is discharged out through the outlet 12. While the fluid is sprayed through the orifices 34 and collides with the collision plate 35, microbubbles are formed by decompression and shock. The microbubbles can be easily formed even at low pressure.

Figure 2A:
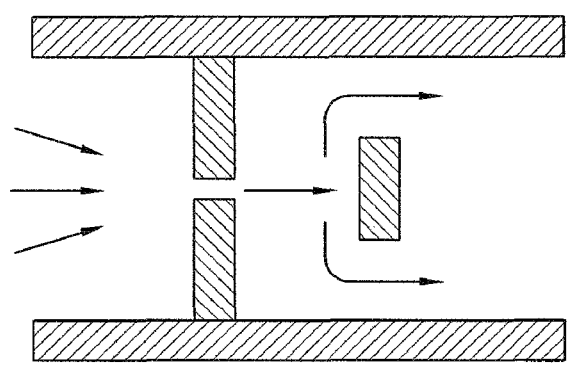
FIG. 2(a) illustrates a test nozzle Noz(B)
Figure 2B:
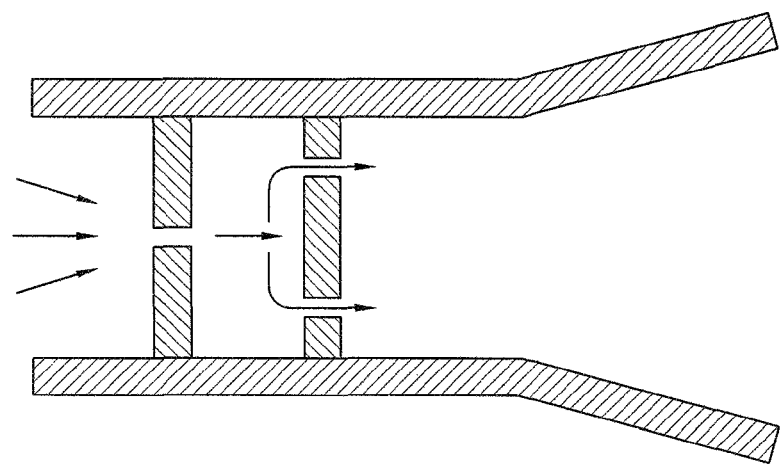
FIG. 2(b) illustrates a test nozzle Noz(C)
Figure 2C:
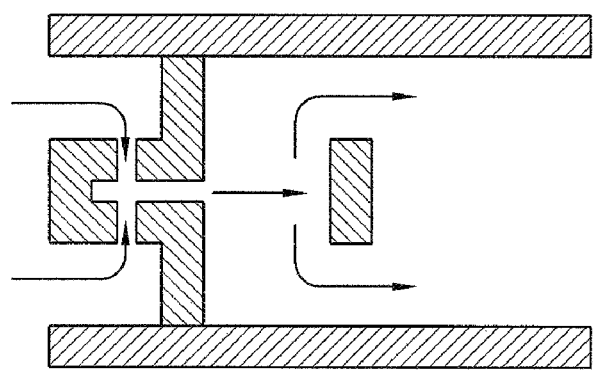
FIG. 2(c) illustrates a test nozzle Noz(D)

In comparison with other nozzles, performance test results of the nozzle according to an embodiment of the present disclosure are shown as follows. FIG. 2 illustrates test nozzles (Noz(B) (FIG. 2(a)), Noz(C) (FIG. 2(b)), and Noz(D) (FIG. 2(c))). Noz(A1), Noz(A2), Noz(A3), Noz(A4) refer to nozzles according to various embodiments of the present disclosure.

Existence time of bubbles according to video analysis is as follows.

TABLE 1

| Nozzle | Bubble existence time |
|---|---|
| Noz(A1) | 6:36 |
| Noz(A2) | 6:28 |
| Noz(A3) | 5:27 |
| Noz(A4) | 5:30 |
| Noz(B) | 2:33 |
| Noz(C) | 0:00 |
| Noz(D) | 3:22 |

The bubble existence time was calculated by measuring the period of time from when a bubble layer was formed until it disappeared. In general, the smaller the bubbles are, the longer the existence time of the bubbles in the fluid will be. The nozzle which had a long bubble existence time generated lots of microbubbles. The bubble existence time of the nozzle according to an embodiment of the present disclosure may be within the range of 5:27 to 6:36, and hence, may have long bubble existence time compared with other nozzles which were in the time range of 0:00 to 3:22.

The number of bubbles counted and average sizes thereof according to analysis results by CCD camera images are as follows.

TABLE 2

| Nozzle | Number of bubbles | Average size of bubbles ($\mu$m) |
|---|---|---|
| Noz(A1) | 4691 | 46.9 |
| Noz(A2) | 4875 | 43.2 |
| Noz(A3) | 4626 | 56.0 |
| Noz(A4) | 4494 | 52.6 |
| Noz(B) | 3223 | 57.2 |
| Noz(C) | 1866 | 58.9 |
| Noz(D) | 3826 | 58.7 |

The number of bubbles by the nozzle according to an embodiment of the present disclosure may be within the range of 4,494 to 4,875, which is more than the number of bubbles by other nozzles which was in the range of 1,866 to 3,826. Furthermore, the average size of bubbles by the nozzle according to an embodiment of the present disclosure may be within the range of 43.2 $\mu$m to 56.0 $\mu$m, and hence, is smaller than the average size of bubbles by other nozzles which was in the range of 57.2 $\mu$m to 58.9 $\mu$m.

Figure 6:
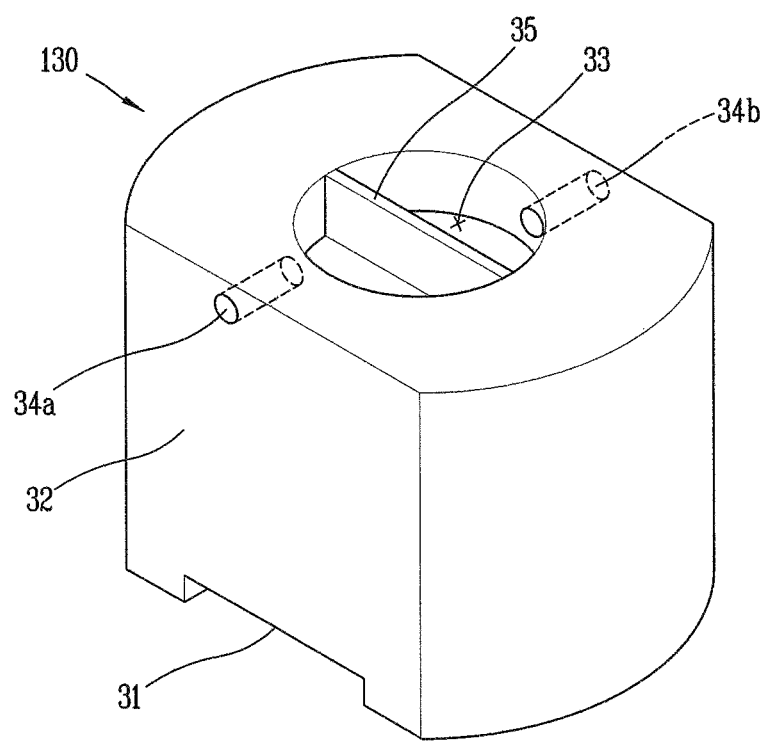
FIG. 6 is a perspective view of a nozzle body according to an embodiment of the present disclosure.

Now, a nozzle for a dissolved air flotation system according to another embodiment of the present disclosure will be described. Aspects of the housing and the nozzle connector similar to the previously described embodiment of the present disclosure is omitted for brevity. FIG. 6 illustrates another embodiment of the nozzle body, and differences in this embodiment from the previously described embodiment will be discussed next.

Orifices 34a and 34b formed in the cut portions 32 of the nozzle body 130 are not formed on the same axis but formed on different axes which are parallel to each other. The orifices 34a and 34b may be formed in rotational symmetry relative to the central axis of the nozzle body 30. That is, because the fluid passing through the orifices 34a and 34b is sprayed eccentrically relative to a collision plate 35, the fluid may obtain a rotational force at the same time as the direction change toward the outlet 12 so as to cause a swirling turbulence.

Figure 7:
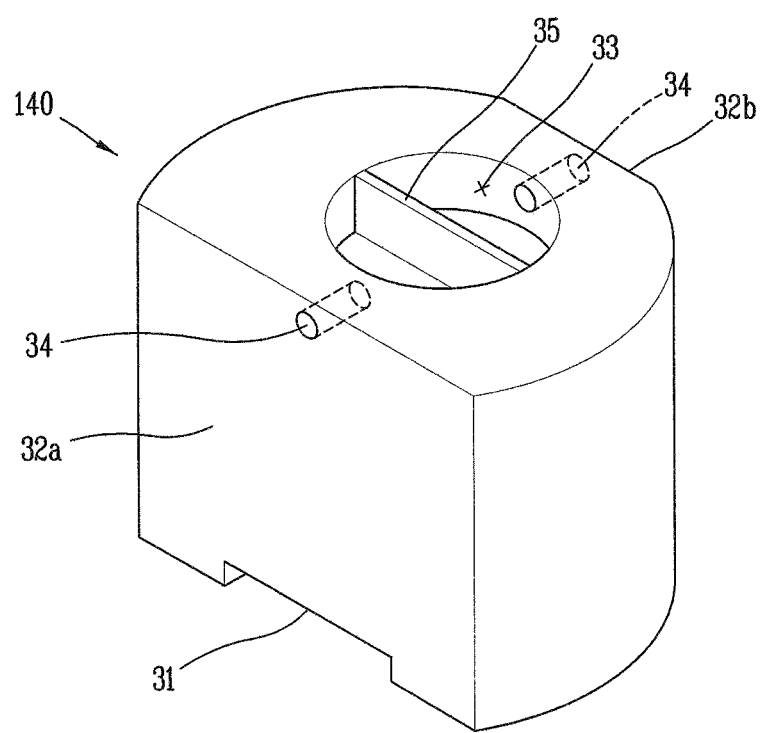
FIG. 7 is a perspective view of a nozzle body according to an embodiment of the present disclosure.

Referring to FIGS. 7 and 8, a nozzle for a dissolved air flotation system according to a an embodiment of the present disclosure will be described. FIG. 7 illustrates a nozzle body according to a further embodiment of the present disclosure.

Figure 8A:
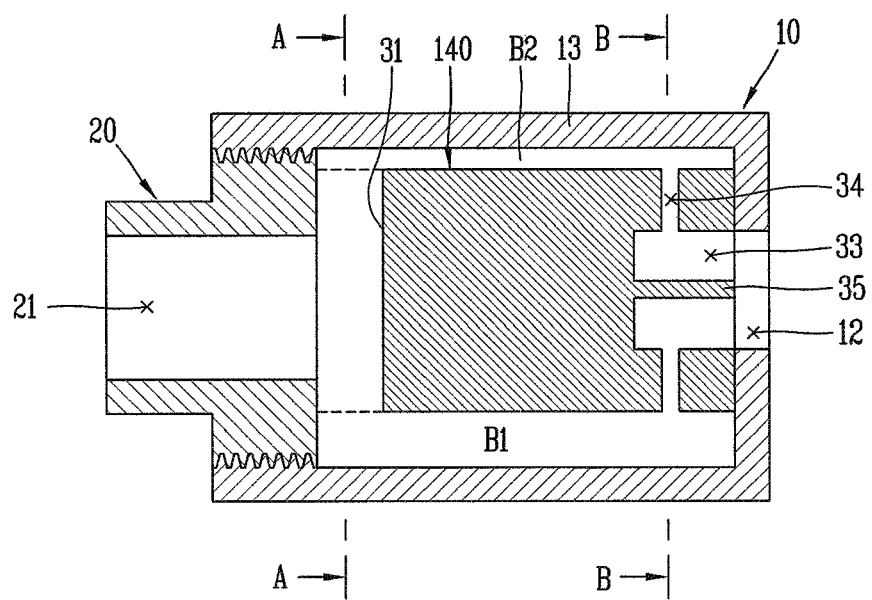
FIG. 8(a) is a cross-sectional view of a nozzle for a dissolved air flotation system to which the nozzle body of FIG. 7 may be applied.
Figure 8B:
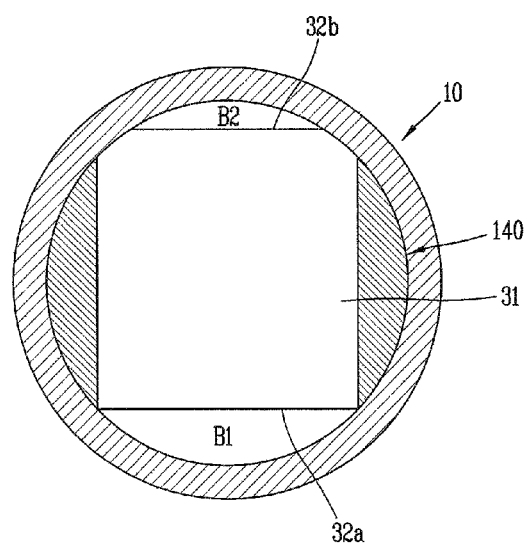
FIG. 8(b) is a cross-sectional view taken along the line A-A of FIG. 7.
Figure 8C:
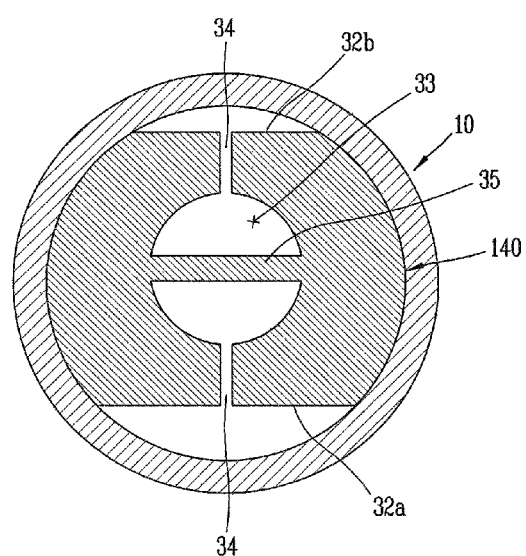
FIG. 8(c) is a cross-sectional view taken along the line B-B of FIG. 7.

FIG. 8(a) is a cross-sectional view of the nozzle to which the nozzle body of FIG. 7 may be applied, FIG. 8(b) is a cross-sectional view taken along the line A-A of FIG. 7, and FIG. 8(c) is a cross-sectional view taken along the line B-B of FIG. 7.

Cut portions 32a and 32b formed at both sides of a nozzle body 140 are formed asymmetrically. That is, the cut portion 32a is wider than the cut portion 32b. Therefore, a side path (B1) formed at the cut portion 32a is wider than a side path (B2) formed at the cut portion 32b so that more fluid can flow through the side path (B1). Because fluids with different flow rates flow through the side paths (B1 and B2) at both sides of the nozzle, the size, distribution range and rise speed of the generated bubbles can be controlled.

Figure 9:
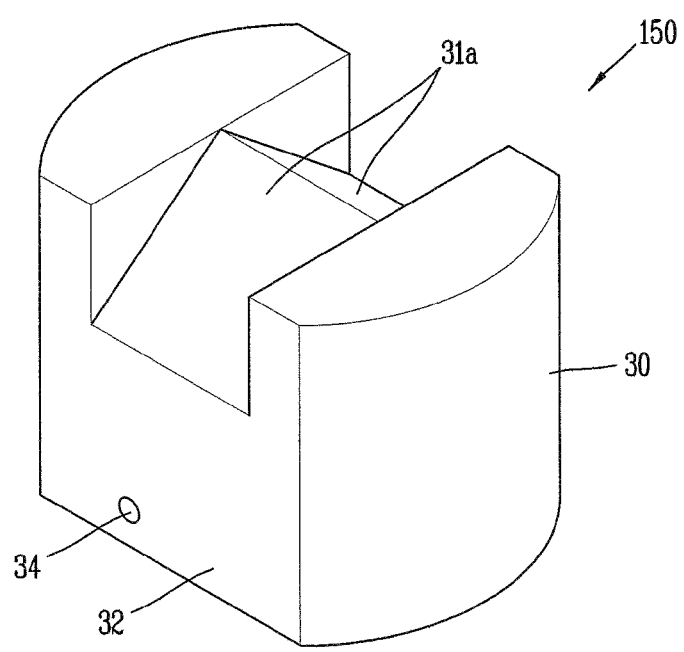
FIG. 9 is a perspective view of a nozzle body according to an embodiment of the present disclosure.

Moreover, a nozzle for a dissolved air flotation system according to a still further embodiment of the present disclosure will be described. FIG. 9 illustrates a nozzle body according to a still further embodiment of the present disclosure. Differently from the above-mentioned embodiments, in this embodiment, a collision portion is formed at the upper portion.

A middle portion of the bottom surface of a collision portion 31a of a nozzle body 150 is inclined high. Therefore, the fluid introduced through the inflow path 21 causes a smooth collision by an obtuse inclined surface at the collision portion 31a, and flows through the side path (B) faster than the fluid by the nozzle body of the first preferred embodiment. Likewise, when the shape of the bottom surface of the collision portion 31a is varied, the collision speed and impulse of the fluid can be controlled.

Figure 10:
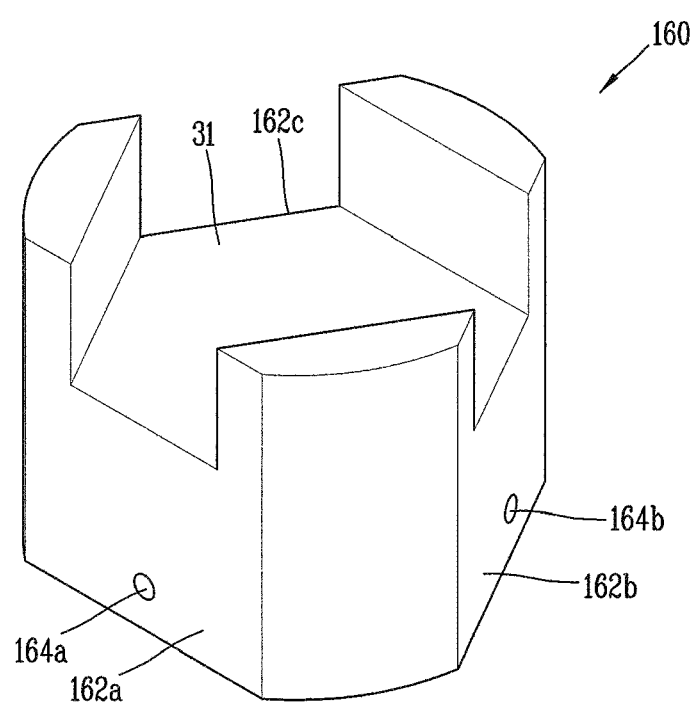
FIG. 10 is a perspective view of a nozzle body according to an embodiment of the present disclosure.
Figure 11A:
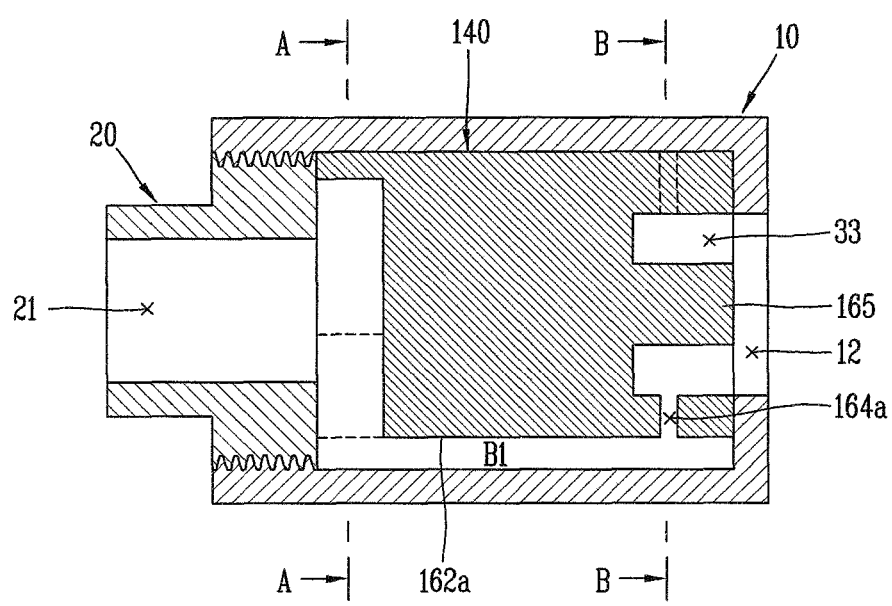
FIG. 11(a) is a cross-sectional view of the nozzle for the dissolved air flotation system to which the nozzle body of FIG. 10 may be applied.
Figure 11B:
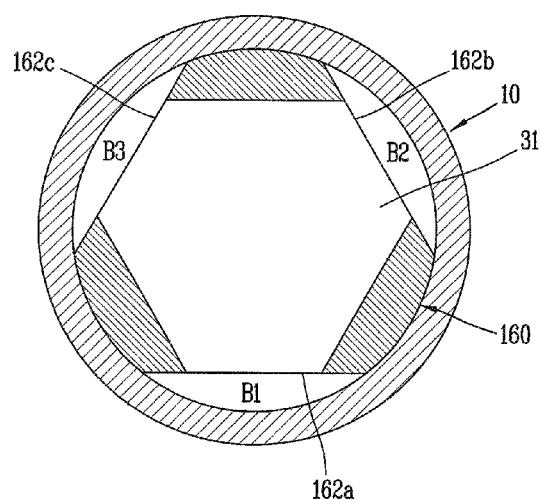
FIG. 11(b) is a cross-sectional view taken along the line A-A of FIG. 10.
Figure 11C:
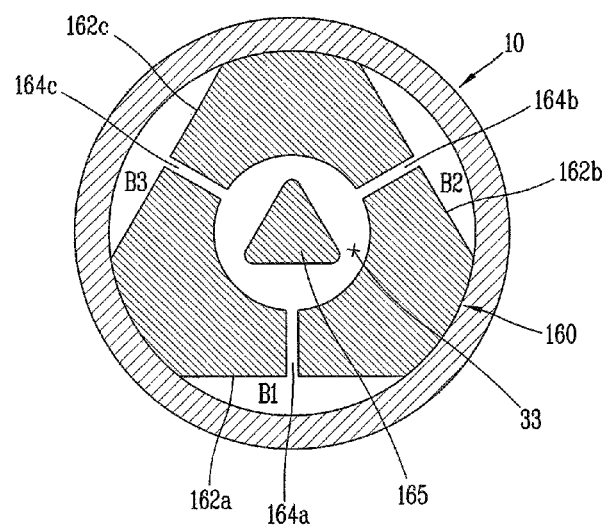
FIG. 11(c) is a cross-sectional view taken along the line B-B of FIG. 10.

Referring to FIGS. 10 and 11, a nozzle for a dissolved air flotation system according to another embodiment of the present disclosure will be described. FIG. 10 illustrates a nozzle body according to another embodiment of the present disclosure. Also in this embodiment, a collision portion is formed at the upper portion. FIG. 11(a) is a cross-sectional view of the nozzle for the dissolved air flotation system to which the nozzle body of FIG. 10 may be applied, FIG. 11(b) is a cross-sectional view taken along the line A-A of FIG. 10, and FIG. 11(c) is a cross-sectional view taken along the line B-B of FIG. 10.

The nozzle body 160 may include three cut surfaces (e.g., cut portions 162a, 162b and 162c) on sides thereof. Therefore, the fluid introduced through the inflow path 21 may be changed in its direction by the collision portion 131 and divided into three flows. There are also three side paths B1, B2 and B3 and orifices 164a, 164b and 164c which are respectively formed at, for example, right angles to the cut surfaces of the cut portions 162a, 162b and 162c. A collision plate 165 formed at the rear end portion of the nozzle body 160 may be formed in the shape of a triangular prism. Likewise, the size and distribution range of microbubbles can be controlled when the flow rate and speed of the fluid are controlled.

As described above, because the nozzle body according to the embodiments of the present disclosure may be provided in one part that can be easily replaced with a different one as occasion demands, the nozzle can easily control the size and rise speed of microbubbles through control of the flow rate and speed of the fluid. Additionally, the nozzle for the dissolved air flotation system has a simple structure, is easy to manufacture, and reduces manufacturing costs.

While the present disclosure has been particularly shown and described with reference to exemplary embodiments thereof, it will be understood by those of ordinary skill in the art that various changes and modifications may be made therein without departing from the technical idea and scope of the present invention and such changes and modifications belong to the claims of the present disclosure.

Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A nozzle for a dissolved air flotation system, comprising:
    a housing of a tube type which has an inlet formed at one side and an outlet formed at another side;
    a nozzle connector that couples to the inlet and has an inflow path formed in a longitudinal direction; and
    a nozzle body disposed in the housing, the nozzle body including:
        a collision portion formed at a first end portion of the nozzle body such that a fluid introduced along the inflow path of the nozzle connector changes its flow direction and collides with an inner wall of a side portion of the housing,
        a plurality of faces formed at sides of the nozzle body,
        a plurality of side paths defined between the faces and the inner wall of the housing,
        a spurt hole defined at a second end portion of the nozzle body, the second end portion being defined as an opposite to the first end portion,
        a collision plate disposed at the spurt hole, and
        at least two orifices respectively defined between the faces and the spurt hole such that the fluid sprayed through the orifices collides with the collision plate.

2. The nozzle according to claim 1, wherein the collision portion is a partially dented surface of the first end portion.

3. The nozzle according to claim 2, wherein the surface includes an inclined surface having a middle portion that is higher than an outskirt portion.

4. The nozzle according to claim 1, wherein the faces are a pair of parallel surfaces of the nozzle body.

5. The nozzle according to claim 1, wherein the side paths have different cross-sectional areas.

6. The nozzle according to claim 1, wherein the at least two orifices are formed at right angles to the faces.

7. The nozzle according to claim 6, wherein the at least two orifices are formed on different axes.

8. The nozzle according to claim 1, wherein the collision plate is formed at a right angle to a central axis of one of the offices.

9. A nozzle for a dissolved air flotation system comprising:
    a housing having an inlet and an outlet, the inlet being wider than the outlet;
    a nozzle connector that includes a cylindrical tube partially disposed in the housing; and
    a nozzle body disposed in the housing, the nozzle body including
        a plurality of faces formed at sides of the nozzle body that define a plurality of side paths between the faces and an inner wall of the housing,
        a collision portion formed at a first end portion of the nozzle body such that a fluid introduced along an inflow path of the nozzle connector collides with the collision portion so as to be diffused into the plurality of side paths, and
        a spurt hole defined at a second end portion of the nozzle body that collects flows of the fluids passing through the plurality of side paths, the second end portion being defined as an opposite to the first end portion.

10. The nozzle according to claim 9, wherein the fluid collides at right angles to the inner wall of the housing.

11. The nozzle according to claim 9, wherein a collision surface of the collision portion is at an obtuse angle with respect to a direction in which the fluid is introduced along the inflow path of the nozzle connector.

12. The nozzle according to claim 9, wherein the side paths have different cross-sectional areas.

13. A nozzle for a dissolved air flotation system comprising:
    a housing having an inlet and an outlet, the inlet being wider than the outlet;
    a nozzle connector that includes a cylindrical tube partially disposed in the housing; and
    a nozzle body disposed in the housing, the nozzle body including
        a plurality of faces formed at sides of the nozzle body to define a plurality of side paths between the faces and an inner wall of the housing,
        a collision portion formed at a first end portion of the nozzle body such that a fluid introduced along an inflow path of the nozzle connector collides with the collision portion so as to be diffused into the plurality of side paths,
        a spurt hole defined at a second end portion of the nozzle body that collects flows of the fluids passing through the plurality of side paths, the second end portion being defined as an opposite to the first end portion, and
        at least two orifices are defined in the second end portion of the nozzle body and respectively connect the side paths with the spurt hole.

14. The nozzle according to claim 13, wherein a collision plate is disposed inside the spurt hole.

15. The nozzle according to claim 14, wherein the orifices and the collision plate are disposed at right angles to each other.

* * * * *